Anton Sommer
Ludwig Muncke
Inventors.

By Karl F. Ross
Attorney

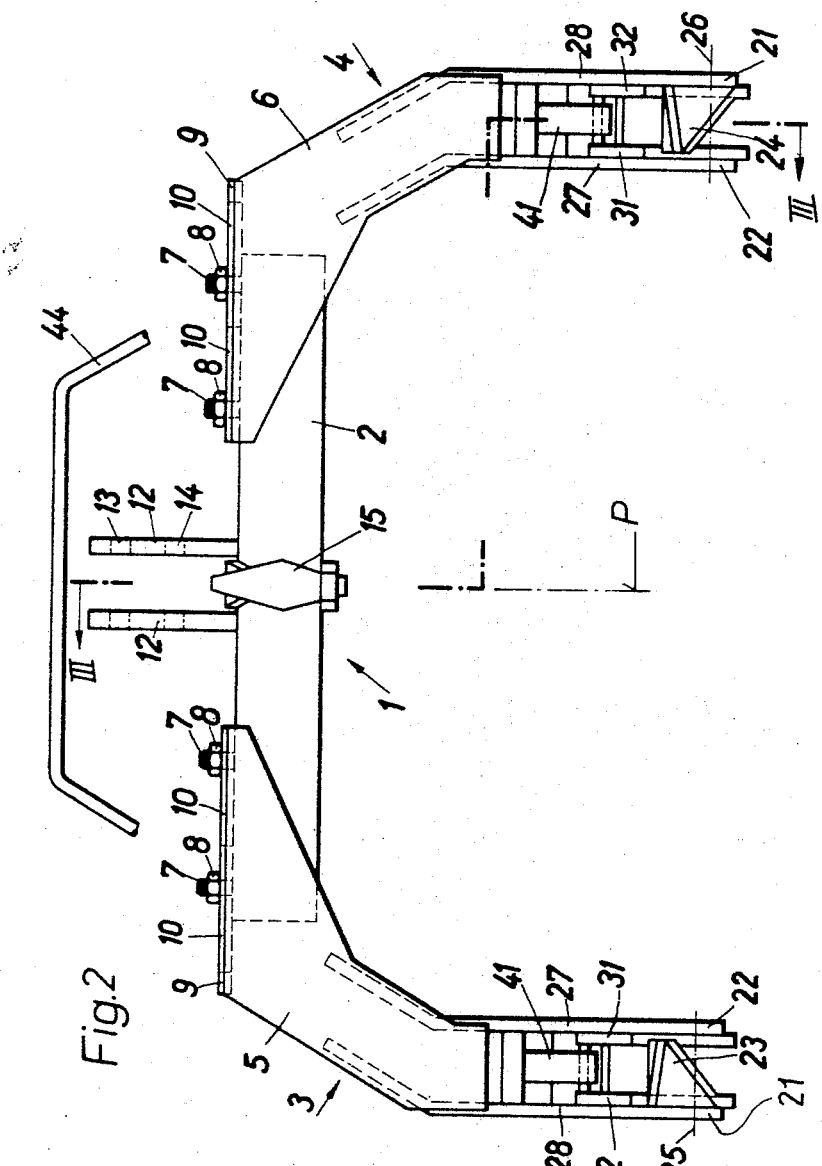

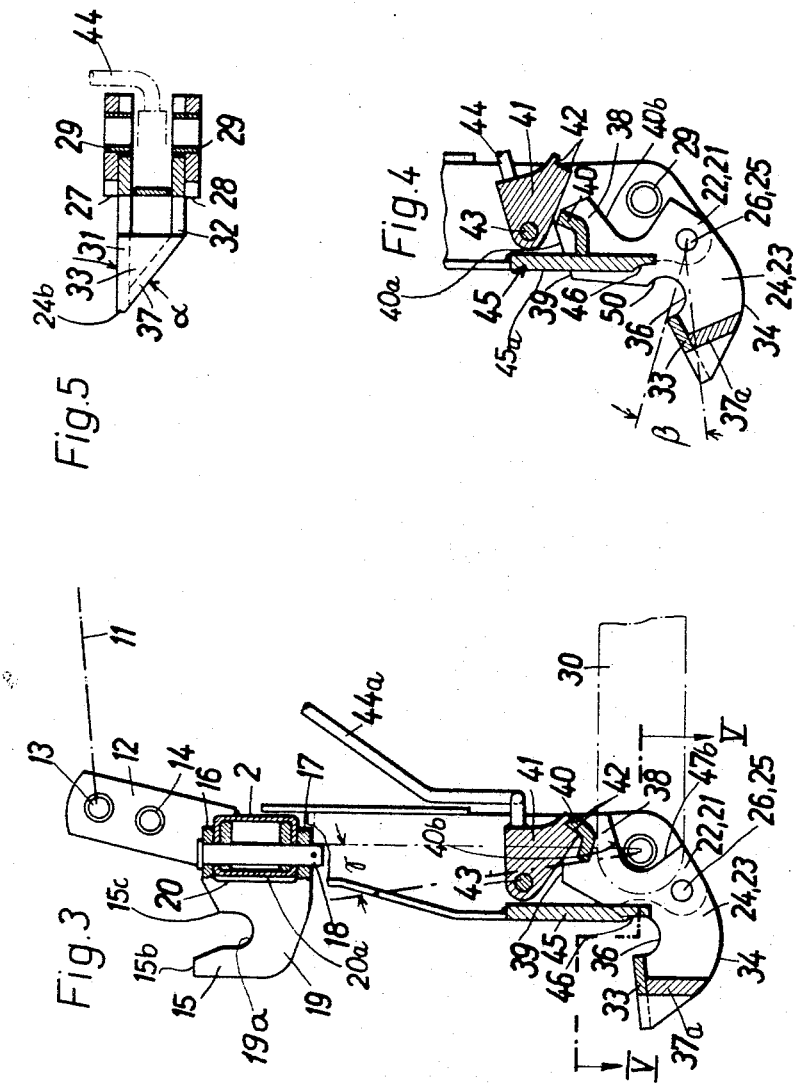

United States Patent Office 3,427,046
Patented Feb. 11, 1969

3,427,046
QUICK-RELEASE HITCH FOR IMPLEMENTS
Anton Sommer, Dorndorf, and Ludwig Muncke, Morlenbach, Germany, assignors to Deere & Company, Moline, Ill.
Filed Nov. 30, 1966, Ser. No. 597,984
Claims priority, application Germany, Dec. 4, 1965,
E 30,601
U.S. Cl. 280—479           10 Claims
Int. Cl. B60d *1/04, 1/16;* A01b *51/00*

ABSTRACT OF THE DISCLOSURE

A quick-release hitch for agricultural implements having a frame provided with upper and lower hooks for connection to the implement and mounted upon the three-point tractor linkage so as to be tiltable about a horizontal axis to shift the upper end of the frame toward the implement and cause the swingable upper hook to engage a pin on the implement. This hook is swingable about an upright axis while the lower hooks on the shanks of the frame are adapted to be locked against swinging movement to retain the implement but are releasable by the tractor operator upon movement of a lever disengaging a pawl from the lower hooks.

---

The present invention relates to a quick-release hitch for agricultural implements and the like and, more particularly, to a three-point quick release and rapid-connection hitch capable of providing effective attachment of an exchangeable implement or agricultural device with a tractor or other prime mover.

Quick-release and quick-connection hitches for the detachable coupling of an agricultural implement or towed attachment to a prime mover forming the towing vehicle have already been proposed and are of various degrees of complexity. In one type of hitch for the connection of a working implement to an agricultural tractor, a frame is connectable to the three-point hitch, this frame being engaged by connecting hooks upon the implement. Other arrangements using frame-like hitches are provided with upper and lower connecting means and have the disadvantage that the implement and the tractor must be relatively closely aligned to facilitate connection of the hitch and are incapable of being properly connected when even a slight disalignment of the prime mover and the towed implement exists.

It is the principal object of the present invention to provide an improved hitch for the quick-release coupling of an agricultural implement such as a plow to a towing vehicle such as a tractor whereby the need for careful alignment and a multiplicity of coupling operations characterizing earlier systems can be obviated.

Another object of this invention is to provide an improved coupling device adapted to be mounted upon a three-point linkage which facilitates the coupling and decoupling of an implement by reducing the number of operations involved.

These objects, it has been found, can be attained in accordance with the present invention, by providing a frame having an upper coupling hook and a pair of lower coupling hooks (forming the upper and lower coupling means), which is mounted upon the three-point linkage of an agricultural tractor or the like so as to be tiltable about a horizontal axis for coupling purposes to bring the hook-carrying upper bar of the frame rearwardly, while this hook itself is mounted with at least limited freedom of movement upon this bar. In this manner, the position of the upper coupling hook can change relative to the lower coupling hooks in such manner that, with respect to these lower hooks, the level of the upper hook can be reduced. Only upon movement of the frame into engagement with the implement and engagement of the upper hook with the corresponding pin of the implement is the frame tilted back to permit the lower implement pins to be guided into engagement with the lower hooks. This arrangement is, consequently, effective to permit engagement of the frame with the implement even where the implement or the tractor stands on irregular surfaces and thus may be somewhat misaligned, where the tractor cannot be backed directly into the implement or is somewhat offset therefrom, and where the implement itself does not stand evenly upon the ground surface.

Furthermore, the movability of at least the upper coupling hook in a limited lateral sense permits any minor misalignment of the tractor and implement to be overcome and the implement to be engaged so that proper alignment is reestablished by engagement of the lower coupling pins of the implement with the respective hooks.

According to a further feature of this invention, the lower hooks connecting the implement with the frame are tiltable about respective horizontal axes while the frame itself is tiltable about its junction with the lower link member of the three-point linkage connecting the frame with the tractor; the upper member of the three-point linkage is elongatable. Thus, the tilting of the frame by rapid elongation of the upper link member and the shortening of the vertical distance between the upper hook and the lower hooks can take place rapidly as well as automatically. It has been found to be advantageous, moreover, to impart a generally triangular or wedge shape to the two lower coupling hooks which are movably mounted as indicated at the lower shanks of the frame, a locking means actuatable by the vehicle operator being provided to release the lower hooks from the implement pins. The swingable character of the lower hooks permits the pins to slide into the latter even if originally they are somewhat misplaced and, furthermore, cammingly lifts the implement into position during backing movement of the tractor so that original misalignment can be corrected during the coupling movement. This upward camming operation can be attributed to the curvature applied, in accordance with this invention, to the ground-engaging underside of the lower coupling hooks or shoes. This curvature has its center on the tilting axis of the frame so as not to impede the tilting operation. The wedge-shaped configuration of the lower coupling hooks facilitates guidance of the pins onto the lower hooks and the proper location of the pins with respect to the latter.

The above and other objects, features and advantages of the present invention will become more readily apparent from the following description, reference being made to the accompanying drawing in which:

FIG. 2 is an elevational view of the device, partly broken away;

FIG. 3 is a cross-section taken generally along the line III—III of FIG. 2;

FIG. 4 is a cross-sectional view corresponding to a fragment of FIG. 3 but showing the lower coupling hook in condition to receive the implement; and FIG. 5 is a view taken along the line V—V of FIG. 3.

Figure 1:
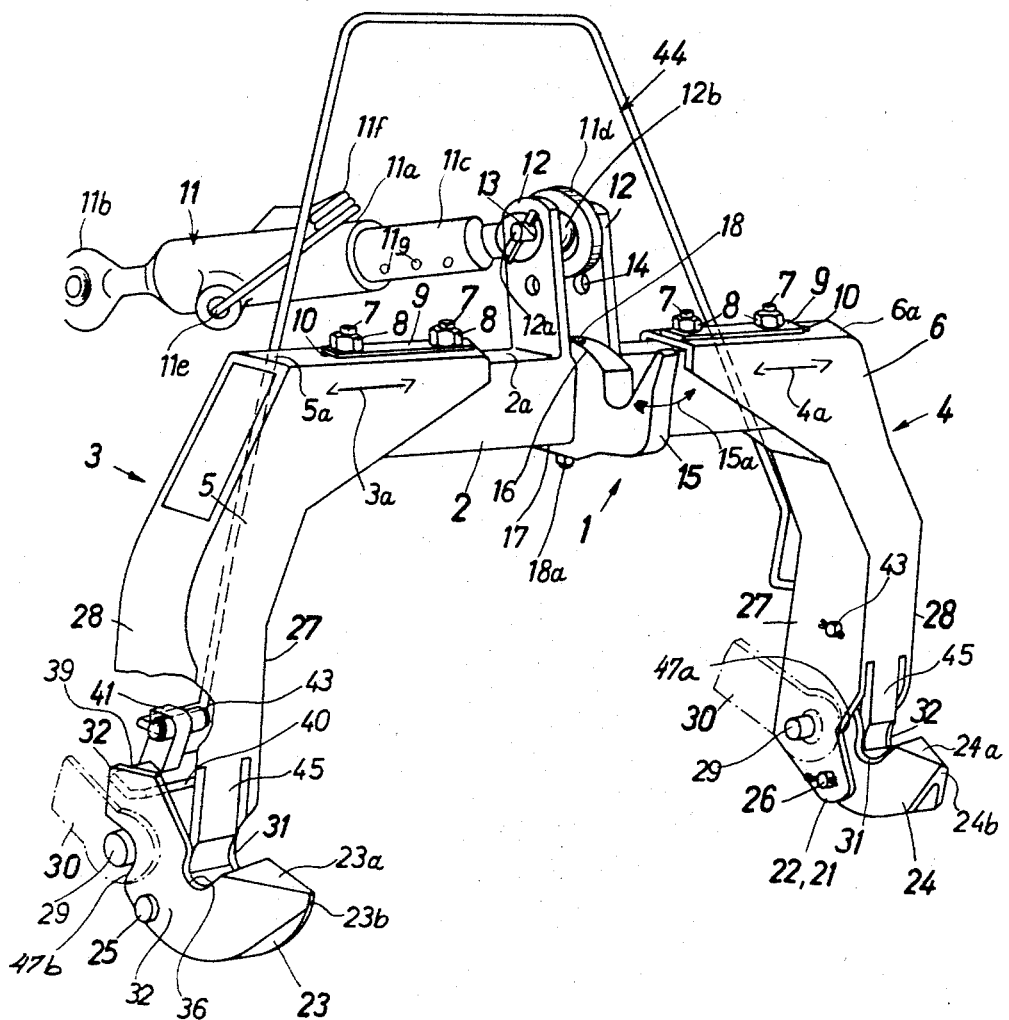
FIG. 1 is a perspective view of the coupling device of the present invention.

In the drawing, there is shown a three-point hitch for raisable and lowerable agricultural implements and the like adapted to be attached releasably and rapidly to an agricultural tractor or other towing vehicle. As can be seen especially in FIG. 1, the frame 1, which is of inverted-U configuration, is carried by a single upper link member 11 and a pair of lower link members 30 of the usual tractor three-point hydraulically actuatable lifting and lowering hitch mechanism. The three-point linkage 11, 30 is mounted upon a tractor in conventional manner and has not been illustrated in greater detail in the drawing. The upper member 11 of the three-point tractor linkage is of variable length and, for this purpose, can consist of a telescoping tube (FIG. 1). The telescoping arrangement includes a sleeve 11a whose eye 11b is pivotally connected to the seat post of the tractor or some other portion of the tractor body; the sleeve 11a receives an inner telescopic member 11c whose eye 11d, in turn, pivotally connects the elongatable link member 11 with the frame 1. A locking finger 11e is biased by a spring 11f integral therewith into the sleeve 11a for locking the telescopic member 11 against extension or contraction until this finger 11e is withdrawn by the operator. For this purpose, the inner member 11c may have recesses 11g adapted to receive the finger 11e selectively.

The frame 1 is provided along its central beam 2 with a rearwardly extending (from tractor toward implement) coupling hook 15 and a pair of further coupling hooks 23 and 24, hereinafter referred to as lower coupling hooks. The hooks are removable from and replaceable on the frame. The lower couplings are mounted at the ends of the shanks 3 of the frame 1 as is evident especially from FIGS. 1 and 3. The three coupling hooks 15, 23 and 24 serve as the means for connecting an implement (not shown in the drawing), such as a plow, to the three-point linkage 11, 30. To this end, the plow or other implement is provided with horizontally extending pins receivable from above in the hooks 15, 23 and 24 so that the implement can be fully supported by the frame 1. The structure and configuration of this frame, while generally illustrated in FIG. 1, can be seen in greater detail in FIGS. 2-5.

The frame 1 is, as mentioned previously, of inverted-U configuration, having a cross beam or bight 2 at its upper end and a pair of shanks 3, 4 extending downwardly from the cross beam or bight 2. The cross beam 2 and the shank 3 are of box-like cross-section, i.e. of rectangular profile, so as to be rigid against stress applied in all directions to the cross beam and shank. The shanks 3 and 4 are horizontally shiftable relatively to one another (arrows 3a and 4a) and to the cross beam 2 so as to permit adjustment of the horizontal separation of the hooks 23 and 24 and their location with respect to the hook 15. To this end, the upper extremities of the shanks 3 and 4 are provided with saddle-shaped supporting portions 5 and 6 whose inverted-U section permits them to receive the ends of the cross beam 2. Bolts 7 are mounted in the web 2a of the cross beam 2 of frame 1 and extend upwardly through longitudinal slots 10 in the webs 5a and 6a of the socket-forming saddle portions 5 and 6, thereby permitting movement of the shanks 3 and 4 in the direction of the arrows 3a and 4a along the cross beam 2 and the locking of the shank in place by a tightening of nuts 8 to clamp the plates 9, which overlie and extend laterally beyond the slots 10, against the webs 5a and 6a. The disengagement permits the setting of the positions of the hooks 23 and 24 to the lower lateral pins of the implement regardless of the span of the hitching portion of the latter.

The eye 11d of the upper link 11 is pivotally connected to the cross beam 2 by a pair of forwardly inclined trunnion lugs 12 which receive the hook 15 and the eye 11d between them. These lugs can be cast integrally with the cross beam 2 or may be welded into by conventional techniques. Aligned bores 13 and 14 spaced apart at different levels of the lugs 12 may selectively receive a pin 12a whose bearing portion 12b is disposed in the eye 11d and forms a journal for the latter. Thus, the link 11 can be pivotally connected to the frame 1 at two positions (corresponding to bores 13 and 14). The extensibility of the upper link 11 should be about 100 mm.

As can be seen in FIGS. 1 and 3, the upper hook 15 is located between the lugs 12 and in a plane perpendicular to the plane of the frame 1 and, therefore, the cross beam 2 at the center of the frame. The hook 15, moreover, is provided with upper and lower flanges 16 and 17 (FIG. 3) which overlie and underlie the beam 2 and tightly hug the latter. A throughgoing bolt 18 passes through the flanges 16 and 17 as well as the cross beam 2 so that the hook 15 has at least limited swinging motion about the axis formed by the vertical bolt 18. To permit this swinging motion (arrow 15a, FIG. 1), a clearance 20a (FIG. 3) is provided between the inner side 20 of the hook 15 and the confronting surface of the cross beam 2. The angle of swing of the hook 15 about the pin 18 should be about 8° before it is limited by engagement of the surface 20 with the rear face of the beam 2. A cotterpin 18a retains the pin 18 in place. The center portion 19 of the hook 15 is formed with an upwardly open semicircular recess 19a in which the respective pin of the implement can rest, the front portion 15b of this hook being inclined toward the recess 19a to guide the pin of the implement into the latter. A similarly inclined flank 15c behind the recess 19a further acts as a guiding surface when the frame 1 is raised below the pin in the event the implement pin is not disposed directly above the recess 19a. Because of the pivotability of the hook 15, the hook automatically repositions itself upon engagement with the implement pin should there be any slight canting of the latter with respect to a vertical plane. As can be seen in FIG. 2, the center portion 19 of the upper coupling hook 15 is of ball-shaped configuration to facilitate guidance of the hook relative to the implement.

The lower ends 21 and 22 of the shanks 3 and 4 of the frame 1 (FIGS. 3-5) are provided with pivot pins 25 and 26 which swingably support the lower hooks 23 and 24 upon the lateral walls 27 and 28 of the box-like shanks 3 and 4. Similarly, a pin 29 passes through each of the shanks 3 and 4 (see FIGS. 1 and 4) to serve as pintles for articulating the links 30 of the three-point tractor linkage to the frame 1. The lower coupling hooks 23 and 24, moreover, are provided with a pair of lateral flanges 31 and 32 on opposite sides of the shoe 23a and 24a which are connected by a reinforcing member 33 at the forward ends of the shoe and lie parallel to the lateral portions 27 and 28 of the shanks 3 and 4.

Along the inner wall 31 (FIGS. 1 and 5) of each shoe 23, 24, with respect to the median plane P through the frame 1, there is provided a rounded underside or edge 34 which extends upwardly and rearwardly toward the point 23b, 24b of the respective hook. In plan view, the coupling hooks 23 and 24 are of wedge-like configuration (FIG. 5) with the wedge point coinciding with the point 23b, 24b of the forward end of the shoe. The flank 27 which is inclined to the surface 31 of the respective shoe to form the wedge preferably includes an angle α (FIG. 5) of approximately 45° therewith. Other wedge-shapes are also possible in the sense that both flanks 31 and 37 can converge toward a central plane through the shoe or other mirror-image shapes provided.

According to a further feature of this invention, the side members 31 and 32 are joined by the connecting member 33 in such manner that each coupling hook 23, 24 is covered from above and leads rearwardly from the point to meet a reinforcing cross-plate 37.

The rearward ends 38 of the side members 31 and 32 of the hooks (i.e., the ends thereof remote from the points of the hooks) are formed with upper edges 39 (FIGS. 1, 3 and 5) lying above (with reference to the horizontal) the mouths 36 of the respective hooks 23 and 24. Directly beneath this upper edge 39, an abutment 40 is welded between the side pieces 31 and 32 of the hooks 23 and 24 for co-operation with a locking pawl 41 (FIGS. 1 and 3). The pawl 41, which is pivoted upon a pin 43 in the respective shanks 3 and 4, has a recessed portion 42 adapted to engage the abutment 40 which spans the side pieces 31 and 32 as illustrated in FIG. 1. In the normal position of the pawl 41, the abutment 40 is received in the recess 42 in the clockwise extreme position (FIG. 3) and the shoe 23 or 24 is thus retained in its raised position about the pin 25 or 26. The abutment 40 is of angular cross-section (FIGS. 3 and 4) so that while the rearmost portion 40a is engageable by the detent 41 in the normal position (FIG. 3) of the detent and the hook 23 or 24, the other portion 40b is engageable with a reinforced wall 45 at the rear face of the respective shanks 3 and 4. Moreover, the angular portions 40a and 40b of the abutment 40 cup the pawl 41 between them to prevent any spontaneous movement of the hooks 23 and 24 or release of the pawl 41.

The pins 43 are bent end portions (FIG. 1) of a release lever 44 bent from a metallic rod (see FIGS. 1 and 3). The release lever 44 extends above the upper linkage member 11 and is swingable toward the tractor by its weight to bias the pawl 41 in the clockwise sense and hold them in engagement with the abutment 40. When the lever 44 is, however, swung by the tractor operator in the driver's seat in the counterclockwise sense (FIG. 3) toward the implement, the pawls 41 are disengaged (see FIG. 4) and the hooks 23 and 24 permitted to drop under their own weight to the position shown. To facilitate actuation by the operator, the shank 44a of the lever 44 extends from the frame 1 forwardly and upwardly toward the tractor. The angular movement of the shoes 23 and 24 is confined to an angle $\beta$ of about 30° by the abutment 40.

In the lower position of the shoes 23 and 24, the abutment 40 engages the wall portion 45 of the respective shank 3 or 4 at its reinforced abutment region (e.g., formed by welding the plate 45 in place) so that this plate ends generally at the level of the recess or mouth 36 of the hook. At the lower end of the abutment plate 45, there is provided a recess 46 whose curvature conforms to that of the mouth 36 of the hook (see FIGS. 3 and 4) whereby the implement pin receivable in these hooks can be guided directly into place upon engagement with the face 45a of this plate. The recess 46 also permits the mouth 36 to open to receive the implement pin to be relatively large. This is also accomplished by cutting away the lower ends of the side walls 27 of the shanks 3 and 4 (FIG. 1) in the region of the mouth 36 of each hook 23 or 24 at 47a. The shanks 31 and 32 of the hooks 23 and 24 are, moreover, cut away at 47b to accommodate the pintle 29 joining the linkage members 30 to the frame 1. The pawl 41 can, moreover, be held in the position indicated in FIG. 3 by spring means not illustrated while corresponding means may be used for swinging the hooks 23 and 24 (FIG. 4) to its receptive position.

The coupling of an implement with the tractor may then be carried out by the following series of operations:

Initially, the link 11 is fully extended by releasing the pin 11e and permitting a spring or the like within the telescoping sleeve 11a to urge the telescoping parts 11a and 11c to the maximum extension (through a distance of about 100 mm.). Thus the three-point linkage 11, 30 of the tractor cants the frame 1 rearwardly or at its upper end (i.e., in the region of the cross pin 2 and the hook 15) so that the plane of the frame 1 assumes an angle of about 12 degrees with the vertical as indicated in FIGURE 3 (by angle gamma). The tractor is then backed until the coupling hook 15 lies below the upper coupling pin of the implement whereupon the three-point linkage is raised until this coupling pin is received in the mouth 19a of hook 15 and this hook engages the implement. During this raising motion and with further lifting of the frame, the lower pins of the implement slide along the wedge surfaces of the lower hooks 23 and 24 into the mouth 36 thereof until the rounded portion 50 of the shoe 23 or 24 (FIG. 3) is urged rearwardly and the shoe swings in its clockwise sense to be locked by the pawl 41 (FIG. 3). The implement is then firmly held and the linkage can be lowered for use (i.e. until the plow settles on the ground). During this operation, the implement forces the upper portion of the frame 1 toward the tractor (to telescope closed the upper link 11). The pin 11e then enters the corresponding recess 11g to lock this link member.

To decouple the implement from the tractor, it is merely necessary to lower the implement onto the ground and to actuate the stirrup-shaped lever 44. If the frame 1 is lowered further, the hooks 15, 23 and 24 disengage from the pins of the implement and the latter is freed.

It will be apparent that the frame arrangement 1 illustrated and described above does not require accurate alignment of the tractor and the implement inasmuch as the horizontal swingability of the upper hook 15, the wedge-shaped configuration of the lower hooks 23 and 24 and the use of pins on the implement with or without guide surfaces permit a rapid coupling even if some misalignment was originally present.

What is claimed is:

1. In combination with a three-point linkage of a tractor, a rapid-operation coupling for releasably securing an implement to said three-point linkage, said coupling comprising:

a generally upright frame pivotally mounted upon said three-point linkage for tilting movement of said frame about a horizontal axis to swing the upper portion of the frame downwardly and in the direction of said implement, upper and lower coupling means on said frame respectively engageable with complementary elements on said implement, and tilting means connecting said upper portion of said frame with said three-point linkage for enabling at least temporarily the free swinging movement of said frame about said axis to tilt said upper coupling means downwardly and in the direction of said implement to engage said upper coupling means beneath the complementary element on said implement, and for thereafter enabling relatively free reverse tilting movement of said frame to seat said element in the respective coupling means, at least one of said upper and lower coupling means including a hook having limited freedom of movement on said frame and adapted to receive the corresponding element.

2. In combination with a three-point linkage of a tractor, a rapid-operation coupling for releasably securing an implement to said three-point linkage, said coupling comprising:

a generally upright frame, said three-point linkage including a pair of lower link members pivotally connected to the frame and defining a horizontal axis therewith, and an upper link member pivotally connected to said frame, upper and lower coupling means on said frame respectively engageable with complementary elements on said implement, tilting means for at least limited pivotal movement of said frame about said horizontal axis to temporarily alter the vertical distance between said upper and lower coupling means and thereafter increasing said distance to seat said elements in the respective coupling means, at least one of said upper and lower coupling means including a hook having limited freedom of movement on said frame and adapted to receive the corresponding element, said tilting means including means varying in length of said upper link member for pivoting said frame about said axis, said hook forming said upper coupling means and being swingable about an upright axis relative to said frame, and said frame including a cross beam carrying said hook and a pair of shanks extending downwardly from said cross beam and provided with said lower coupling means.

3. The combination defined in claim 2 wherein said lower coupling means includes:

a pair of lower hooks swingably mounted on said shanks for movement about respective horizontal axes, for guiding pins carried by said implement into said lower hooks upon movement of said frame toward said implement;

locking means on said frame engageable with said lower hooks for retaining said pins therein; and operator-controlled release means for disengaging said locking means to permit introduction of said pins into said lower hooks.

4. The combination defined in claim 3 wherein said shanks are of box-like section and each of said lower hooks is provided with a pair of parallel side members lying along walls of said shanks and connected thereto for pivotal movement about said respective horizontal axis, said locking means including an abutment limiting the angular stroke of each of said shanks and bridging the respective side members, and a locking pawl pivotally mounted in each shank and engageable with the respective abutment for releasably engaging same, said lower hooks being of triangular configuration for guiding said pins into said lower hooks.

5. The combination defined in claim 4 wherein said shanks are each provided with reinforcing plates engageable by said abutments upon release of said abutments by said pawls, said lower hooks having upwardly open mouths, said plates terminating at said mouths in recesses having curvatures corresponding to that of said mouths in the locked position of said lower hooks for aligning said pins with said mouths.

6. The combination defined in claim 5 wherein said operator-controlled release means includes a stirrup-shaped actuating lever extending upwardly from said shanks toward said tractor, said pawls being mounted upon and swingable with said lever, said abutments each having a pair of angularly offset engagement portions for retaining the respective pawls and thereby limiting swinging movement of said lower hooks in either sense.

7. The combination defined in claim 3 wherein said lower hooks are formed with inwardly inclined guide portions converging to tips of said lower hooks, the undersides of said lower hooks being curved upwardly toward said tips, said hooks all having guide surfaces diverging outwardly and upwardly from the respective mouths and guiding respective pins constituting said elements into said mouths.

8. The combination defined in claim 3 wherein said hook is provided with a pair of upper and lower flanges engageable around said cross beam, said coupling further comprising a bolt extending through said flanges and said cross beam for pivotally mounting said hook thereon, said hook being formed with a clearance from said cross beam enforcing limited angular movement of said hook about said bolt.

9. The combination defined in claim 3 wherein said hook has generally ball-shaped flanks converging toward its mouth for guiding said hook relative to said implement.

10. The combination defined in claim 3 wherein said hooks are replaceably mounted on said frame and said shanks are shiftable in the plane of said frame relatively to said cross beam.

References Cited

UNITED STATES PATENTS

| | | | |
|---|---|---|---|
| 3,090,639 | 5/1963 | Virtue et al. | 280—479 X |
| 3,220,751 | 11/1965 | Tweedale | 280—461.1 |
| 3,231,294 | 1/1966 | Horney | 280—479 X |
| 3,312,478 | 4/1967 | Knaapi | 280—405 |

OTHER REFERENCES

Huneke, Walter; German DAS 1,134,235 published Aug. 2, 1962.

Wehsley, Karl; German printed application; 1,198,602 published Aug. 12, 1965.

LEO FRIAGLIA, *Primary Examiner.*

U.S. Cl. X.R.

172—272; 280—461

PO-1050
(5/69)

UNITED STATES PATENT OFFICE
CERTIFICATE OF CORRECTION

5183

Patent No. 3427046            Dated 16 July 1969

Inventor(s) Anton SOMMER, Ludwig MUNCKE

It is certified that error appears in the above-identified patent and that said Letters Patent are hereby corrected as shown below:

In the heading, col. 1, lines 4 and 5 change "assignors to Deere & Company, Moline, Ill." to -- assignors of one-half to Gebrüder Eberhardt, Ulm, Germany, by mesne assignment, one-half to Deere & Compa Moline, Ill. --

SIGNED AND
SEALED
NOV 25 1969

(SEAL)
Attest:

Edward M. Fletcher, Jr.
Attesting Officer

WILLIAM E. SCHUYLER, J
Commissioner of Patent